United States Patent [19]

Botbol

[11] 3,836,075
[45] Sept. 17, 1974

[54] CLEATED EMERGENCY TRACK

[76] Inventor: Joseph M. Botbol, 3129 S. Akron Ct., Denver, Colo. 80231

[22] Filed: Sept. 5, 1972

[21] Appl. No.: 286,005

[52] U.S. Cl. ................................................ 238/14
[51] Int. Cl. .......................................... B60c 27/00
[58] Field of Search .............................. 238/14, 10

[56] References Cited
UNITED STATES PATENTS

| | | | |
|---|---|---|---|
| 2,479,760 | 8/1949 | Merrick | 238/14 |
| 3,342,414 | 9/1967 | Jureit | 238/14 |
| 3,395,862 | 8/1968 | Lundberg | 238/14 |
| 3,672,422 | 6/1972 | Greipel | 238/14 |

*Primary Examiner*—M. Henson Wood, Jr.
*Assistant Examiner*—Richard A. Bertsch

[57] ABSTRACT

A cleated emergency track for placement in the intended path of travel of a ground-engaging wheel of a vehicle includes a plate having an array of upwardly projecting protrusions providing a gripping surface for the vehicle and a plurality of downwardly extending removable cleats which can be selected to be of different lengths to give the device the capability of being stabilized on various types of low traction or slippery surfaces. The plate is provided with interlocking means on either end thereof defined by latch fingers at one end which are adapted to be releasably received in open slots at the opposite end of an adjacent panel whereby a plurality of the panels can be aligned to provide an elongated track on which the vehicle can establish the desired traction.

10 Claims, 6 Drawing Figures

PATENTED SEP 17 1974    3,836,075
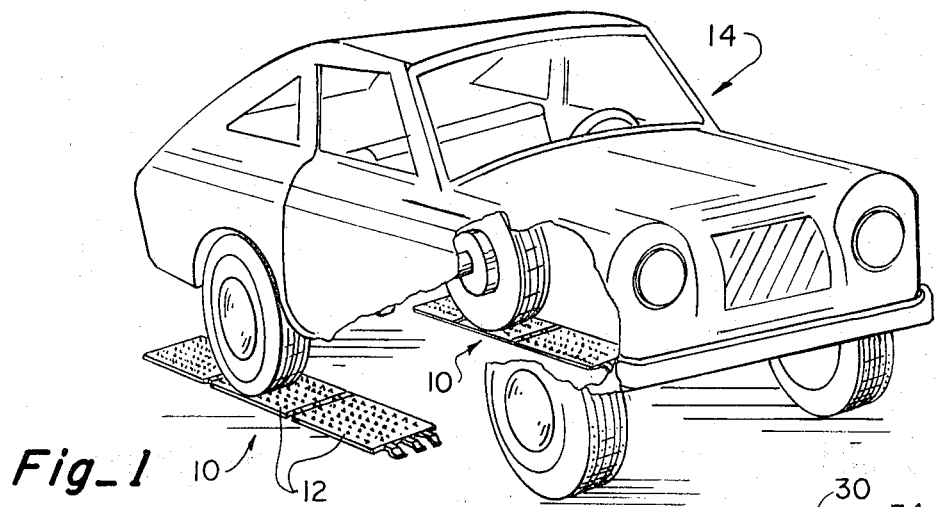
Fig_1
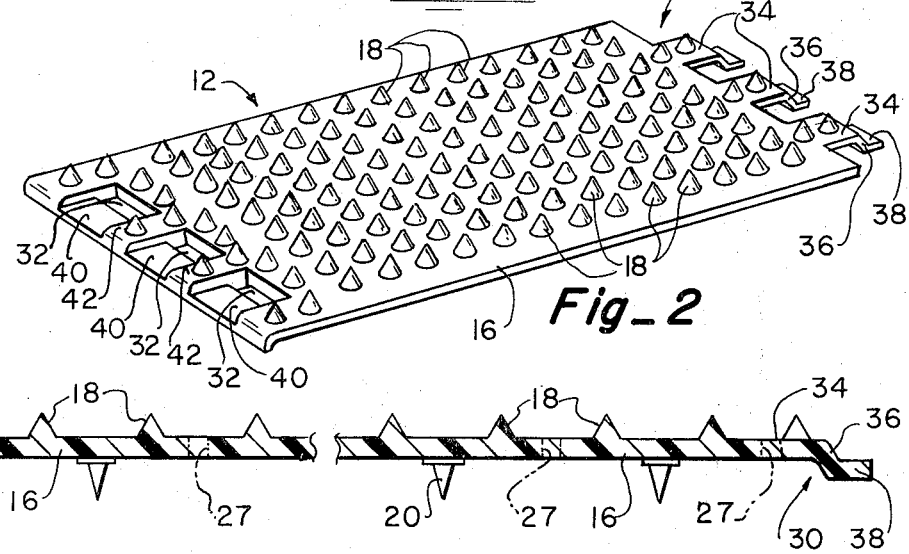
Fig_2
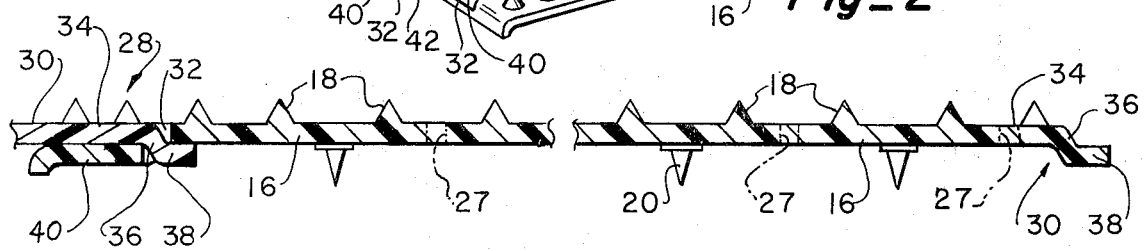
Fig_3
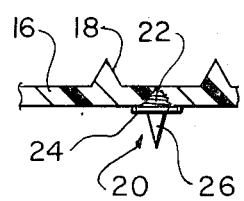
Fig_4
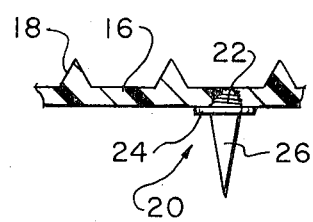
Fig_5
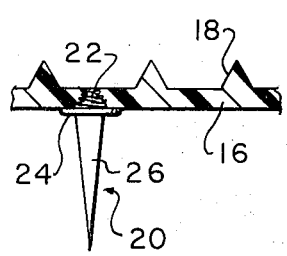
Fig_6

CLEATED EMERGENCY TRACK

BACKGROUND OF THE INVENTION

The present invention generally concerns traction devices for automotive vehicles and more particularly a portable traction plate adapted to be positioned adjacent a ground-engaging wheel of a vehicle in the line of movement thereof to provide a gripping surface for the wheel.

Since the inception of automotive vehicles, numerous devices have been conceived for giving added traction to the vehicle in ice, snow, mud, or other conditions wherein the vehicle does not have normal traction. The two most common of these devices are tire chains which are adapted to be removably attached around the perimeter of the tire and studded tires wherein tungsten or other durable metallic studs are imbedded in the tread of the tire and remain therein even during normal use of the vehicle.

Chains have always been inconvenient to mount on the tire in that it is necessary for the individual to reach down beneath the car to properly secure the chains to the tire and in so doing unavoidably gets dirty from the snow, mud, etc. On the other hand, studded tires have alleviated the necessity of mounting and removing chains from the tires but have been criticized by State and Federal authorities as being detrimental to highway surfaces.

Inasmuch as traction means are not always needed, even in inclement conditions, numerous types of temporary traction devices have been contrived to provide adequate traction for vehicles under emergency conditions. Examples of temporary traction devices would be portable sand dispensers or portable tracks adapted for placement in the line of movement of a wheel of a vehicle. Typical of patented devices of the latter type are disclosed in U.S. Pat. No. 3,225,828 issued to C. H. Godschall, U.S. Pat. No. 3,025,002 issued to R. Kunz, U.S. Pat. No. 3,342,414 issued to J. C. Jureit, and U.S. Pat. No. 2,486,911 issued to H. C. Becker.

SUMMARY OF THE INVENTION

The cleated emergency track of the present invention is of the latter type and is comprised of a small easily manageable plate or plates having oppositely directed projections which will establish gripping surfaces both between the wheel and the plate and between the plate and the ground when placed in the line of movement of the vehicle wheel. An important feature of the emergency track is that each plate is provided with means for positive but releasable interconnection of two or more plates whereby a string or series of the plates can be formed of a desired length. It will be appreciated from the detailed description hereinafter, that the cleated track is particularly well suited for use in emergency situations, such as when a vehicle is stuck in snow, mud, etc. In this situation a single plate or a series of the plates may be placed in the intended line of movement of a wheel so that the wheel will immediately grip the plate when driven. The cleated track accordingly provides an excellent means for relieving vehicles from such disabling situations.

More specifically, the traction device of the present invention comprises a tough, high strength plate having upwardly projecting protrusions or cleats defining a high traction gripping surface for a wheel of the vehicle and removable, downwardly extending protrusions or cleats of various selected lengths to make the device readily conformable for use under different conditions, such as on ice, snow, mud, etc. Opposite ends of each plate are formed to facilitate placement directly beneath a portion of the wheel for initial engagement therewith and are provided with mating latch fingers and slots whereby the latch fingers at the end of one plate can be interlocked in the slots at the opposite end of an adjacent plate to releasably connect a series of plates end-to-end in order to form a traction surface or emergency track of any desired length. Another important aspect of the invention, is that the plates are of a convenient size which can be stored or stacked beneath the seat of an automobile, in the trunk, or other out-of-the-way location so as to be readily available when needed.

Accordingly, it is an object of the present invention to provide a novel and improved portable traction device for automotive vehicles that can be readily placed in the line of movement of a ground-engaging wheel of a vehicle to provide a positive traction surface for the wheel.

It is another object of the present invention to provide a traction device for vehicles which can be used singly or in series and each including a traction plate with upwardly projecting protrusions providing a gripping surface for a ground-engaging drive wheel of the vehicle and removable downwardly extending cleats on the opposite side which can be exchanged for cleats of various lengths so as to be conformable for use on various types of low traction surfaces.

It is another object of the present invention to provide a traction device which includes a rugged durable plate having a gripping surface for a drive wheel of a vehicle, cleat means for stabilizing the plate on a slippery surface, and connection means for releasably connecting a plurality of the plates in end-to-end aligned relationship whereby an elongated high traction surface track can be easily laid out for the vehicle.

It is still another object of the present invention to provide a relatively simple emergency traction device for automotive vehicles designed to be placed directly beneath a drive wheel to effect initial engagement therewith and to provide a high traction surface on which the vehicle can be driven and wherein the plates are of convenient size to be stored in an out-of-the-way location in the vehicle.

BRIEF DESCRIPTION OF THE DRAWING

Other objects, advantages and capabilities of the present invention will become more apparent as the description proceeds taken in conjunction with the accompanying drawings, in which:

FIG. 1 is a perspective view of the cleated track of the present invention in use with an automotive vehicle.

FIG. 2 is an enlarged perspective view of a traction plate used in the track shown in FIG. 1;

FIG. 3 is a further enlarged longitudinal vertical section of the track plate of FIG. 2; and FIGS. 4 through 6 are fragmentary vertical sections through a traction plate showing various types of cleats adapted for use with the traction plate.

DESCRIPTION OF THE PREFERRED EMBODIMENT

A cleated emergency track 10 formed in accordance with the present invention is shown in FIG. 1 with a plurality of traction plates or panels 12 connected to provide an elongated high traction gripping surface for an automobile 14. It will be appreciated from the description that follows that the track can be laid out in the line of movement of any or all of the driven wheels of the vehicle, and also can be used to facilitate turning the vehicle by laying a track in the desired line of movement of a turning wheel of the vehicle.

The traction plate 12 used to form the elongated track 10 is best seen in FIGS. 2 and 3. Each plate 12 is seen to include a flat elongated rectangular base portion 16 having a pattern or array of upwardly projecting protrusions 18 which define a raised high traction gripping surface for the ground-engaging wheel of an automotive vehicle, such as the automobile 14. The base portion preferably is slightly wider than a conventional automobile tire and of any convenient length. It may be fabricated from a tough plastic which will yield slightly with the weight of the vehicle or could be made of other suitable strong materials as long as it will not break under the weight of the vehicle even when placed on uneven terrain.

The protrusions 18 in the preferred form take the shape of solid cones formed integrally with the plate 12 and while the protrusions 18 are shown in FIG. 2 in a plurality of parallel rows, other patterns could be just as suitable. For best traction, it is desirable that the spacing between the protrusions substantially correspond with the spacing between grooves in the tread of the tires and that the protrusions be sized to fit tightly into the grooves whereby maximum non-slipping engagement between the tires and the plate 12 is effected.

To positively prevent slippage between the traction plates 12 and the low traction surface on which they are placed, removable cleats 20 are provided to depend downwardly from the lower surface of the base portion 16 and extend downwardly into the low traction surface as far as need be to positively position the track on the low traction surface. The cleats 20 are removable so that the track is readily conformable to use under different conditions, such as, on ice, snow, sand, mud, etc. by varying the length, size, and configuration of the cleats being used. In the preferred illustrated form, the cleats have a threaded end portion 22 which is separated by an abutment surface 24 from an opposite smooth conical end portion 26 that may take any one of various lengths to facilitate slidable sinking movement into the different types of low traction surfaces. For example, for use on ice, a relatively short cleat, approximately ¼ inch long, as shown in FIG. 5, would be utilized whereas for sand or snow, a cleat of a slightly longer length, approximately ¾ inch, such as shown in FIG. 6, would be used and for mud, a cleat which is substantially longer, approximately 1¼ inch, as shown in FIG. 7, would be used. The cleats may be of the self-tapping type wherein the threaded end portion 22 has a spiral configuration to be self-advancing into the base 16 upon rotative movement of the cleat. Alternately, internally threaded cylindrical holes, not shown, can be formed in the bottom surface of the base so that cleats having mating externally threaded cylindrical portions could be screwed into the openings. It is contemplated that an array of openings 27, FIG. 3, could be passed through the plate 12 so that the plate would sink slightly into a soft low traction surface to provide additional means for preventing slippage of the plate with respect to the low traction surface.

To enable the individual traction plates 12 to be positively but releasably connected to form an elongated track 10 as shown in FIG. 1, the individual traction plates 12 are provided with mating connection or interlocking means 28, FIG. 3, on opposite ends of the base portion 16. In the disclosed form the interlocking means 28 are comprised of latch fingers 30 extending longitudinally away from one end of the plates 12 and receiving slots 32 at the opposite end of the plates whereby the latch fingers of one plate can be releasably inserted into the receiving slots 32 of an adjacent plate to positively connect the plates. Looking first at the latch fingers 30, in the disclosed form there are three such fingers extending longitudinally away from one end of the base portion 16, each finger 30 having an elongated extension portion 34, a downturned intermediate portion 36, and a downwardly stepped, longitudinal extension 38 from the lower end of the intermediate portion 36 which extends parallel to and is spaced below the extension portion 34. Each finger is, therefore, substantially S-shaped in longitudinal cross-section so as to be adapted for releasable interlocking connection with the slots 32 of the adjacent panel as will be described hereinafter. It is important to note that the longitudinal extension 34 is relatively thin and can be wedged beneath the tire of vehicle to provide immediate gripping engagement between the tire and the plate.

The end of the base portion 16 having the receiving slots 32 has three spaced depressed zones defining grooves 40 in which the latch fingers 30 of an adjacent plate are adapted to lie. Each groove 40 terminates at its inner end in one of the slots 32 which extends transversly of the plate 12 and which has a length and width sufficient to allow the intermediate portion 36 and the extension 38 of an aligned finger 30 of an adjacent plate to be inserted therein so that adjacent plates 12 can be interconnected as shown in FIG. 3.

When connecting adjacent plates 12, one plate is positioned substantially horizontally and the plate to be connected is held in oblique relation with the one panel so that the outermost ends of the latch fingers 30 extend into the slots 32 of the panel. The panel to be connected is then pivotally lowered to form a longitudinal extension of the one panel causing the extension 38 of its latch fingers to fit beneath the base portion 16 and the elongated extension portion 34 of the latch fingers to lie in the aligned groove 40 of the one plate so that the upper surfaces of the two adjacent plates 12 are at the same elevation. Raised portions 42 between the grooves 40 extend along the latch fingers so as to prevent the fingers from moving laterally of the plate whereby adjacent connected plates are positively positioned both longitudinally and laterally. In this manner, any number of plates can be interconnected to form a high traction gripping surface of any desired length upon which an automotive vehicle can obtain desired traction in a low traction area. It should be noted that the protrusions 18 extend onto the elongated extension portion 34 of the latch fingers 30 and also onto the raised portions 42 between the grooves 40 to make the raised gripping surface continuous between adjacent connected plates. It is also important to note that the interlocking means 28 allow for limited pivotal movement between adjacent connected panels so that a series of connected panels are adapted to conform to an uneven terrain and will, therefore, provide a somewhat flexible traction surface for a wheel driven thereover.

One preferred method of forming the protrusions 18 in the surface of the plates 12 so that they are of a uniform size, shape and spacing is to make the plates of a plastic material whereby they can be rolled between heated rollers, one having recesses conical cavities at desired intervals, so that as the heated rollers press a plate therebetween, the plastic material on the upper surface of the plate will flow into the cavities thereby forming the conical protrusions 18. By maintaining the rollers at a preselected temperature, the protrusions will retain their shape as they come out of the cavities leaving a uniform array of protrusions which are of the desired size, shape and spacing.

By way of illustration and not limitation, traction plates fabricated in accordance with the embodiment of the invention shown in FIGS. 2 and 3 have been formed from a sheet of plastic material approximately ⅛ inch thick, 14 inches long, and 7 inches wide with the upwardly projecting protrusions 18 extending approximately a quarter of an inch above the base portion 16 and being approximately ⅜ inch wide at their base. Cleats varying in lengths between ¼ inch and 1¼ inch were used depending upon the low traction surface on which the plates were placed. The ¼ inch cleats were found most suitable for use on hard traction surfaces such as ice, ¾ inch cleats were found most suitable on softer surfaces such as sand, or snow, and the 1¼ inch cleats were found most suitable on soft sticky surfaces such as mud. The latch fingers 30 were made approximately 1 inch wide, ⅛ inch thick, and 1½ inches long with the elongated extension portion 34 of the finger being approximately 1⅛ inches long to lie in the mating groove 40 of an adjacent plate which groove extended 1⅛ inches into the opposite end portion of the plate. The grooves were approximately ¼ inch deep so that the fingers rested completely within the groove. The above arrangement was found highly successful in providing a high traction surface for an automobile on various low traction surfaces.

Accordingly, a cleated emergency traction plate has been described which is easy to manage and install adjacent a wheel of an automotive vehicle whereby a vehicle in a low traction area can obtain immediate non-slipping engagement with the traction plate and be driven out of the area simply by laying the desired length of the track in the line of movement of the wheel or wheels of the vehicle. Once the vehicle has been removed from the low traction area, the track can be taken up and separated into individual plates or panels for storage in the vehicle in an out-of-the-way location.

Although the present invention has been described with a certain degree of particularity, it is understood that the present disclosure has been made by way of example and that changes in details of structure may be made without departing from the spirit thereof.

What is claimed is:

1. A traction device for vehicles comprising a base plate adapted to be placed under a ground-engaging wheel of the vehicle in the line of movement thereof, said base plate having a plurality of protrusions extending upwardly from the upper surface of the base plate for non-slipping engagement with said wheel of the vehicle, and a plurality of self-tapping cleats adapted to be screwed into the underside of said base plate at any desired location and extending downwardly from the underside of the base plate for non-slipping engagement with the ground surface whereby to effect a non-slipping relationship between the wheel and the ground surface.

2. The traction device of claim 1 wherein said downwardly extending cleats are removably received in said base plate.

3. The traction device of claim 1 wherein said protrusions are integral with said base plate.

4. The traction device of claim 1 further including a plurality of openings through the base plate to allow the base plate to sink a limited extent into soft ground surfaces to prevent slippage between the base plate and the ground surface.

5. The traction device of claim 1 further including connection means on the base plate for releasably connecting a plurality of the devices together to obtain a larger non-slipping surface.

6. The traction device of claim 5 wherein said connection means comprise interlocking segments.

7. A traction device for vehicles comprising a base plate adapted to be placed in gripping engagement with a wheel of the vehicle in the line of movement thereof, said base plate having a plurality of protrusions extending upwardly from the upper surface of the base plate engaging the wheel to provide a gripping surface therefor, a plurality of cleats extending downwardly from the underside of the base plate engaging the ground surface, and integral interlocking connecting means on opposite sides of the base plate whereby a plurality of identical devices can be interconnected to form an elongated traction surface, said interlocking connection means comprising at least one slot adjacent one side of the base plate and at least one latch finger on the opposite side of the base plate adapted to be inserted into said slot of an adjacent device to releasably connect the adjacent devices.

8. The traction device of claim 7 wherein said latch finger is substantially S-shaped in cross-section.

9. The traction device of claim 8 wherein there are a plurality of said fingers arranged in spaced side-by-side relationship and a plurality of slots disposed to releasably receive fingers of an adjacent device, said slots being separated by raised segments to prevent shifting of the devices relative to each other.

10. A traction device for vehicles comprising a base plate adapted to be placed under a ground-engaging wheel of the vehicle in the line of movement thereof, said base plate having a plurality of integral conical protrusions extending upwardly from the upper surface of the base plate in non-slipping engagement with the wheel, a plurality of downwardly extending cleats threadedly received in the underside of said base plate so as to be exchangeable for cleats of different lengths, said cleats engaging the ground surface in non-slipping relationship therewith, and interlocking means on opposite sides of the base plate whereby a plurality of identical devices can be interconnected to form an enlarged traction surface, said interlocking means comprising a plurality of latch fingers of substantially S-shaped cross-section in spaced side-by-side relationship at one end of the base plate and a plurality of identically spaced slots at the opposite end of the base plate adapted to releasably receive the fingers of an adjacent device, said slots being spaced by raised segments to prevent shifting of interconnected devices relative to each other, said latch fingers and raised segments including upwardly projecting conical protrusions whereby the protrusions are substantially continuous between adjacent connected devices.

* * * * *